US012572170B2

(12) United States Patent
Liu et al.

(10) Patent No.: US 12,572,170 B2
(45) Date of Patent: Mar. 10, 2026

(54) ELECTRONIC DEVICE WITH REMOVABLE ELECTRONIC COMPONENT MODULES

(71) Applicant: Advanced Semiconductor Engineering, Inc., Kaohsiung (TW)

(72) Inventors: Chao Wei Liu, Kaohsiung (TW);
Wei-Hao Chang, Kaohsiung (TW);
Yung-I Yeh, Kaohsiung (TW);
Jen-Chieh Kao, Kaohsiung (TW);
Tun-Ching Pi, Kaohsiung (TW);
Ming-Hung Chen, Kaohsiung (TW);
Hui-Ping Jian, Kaohsiung (TW);
Shang-Lin Wu, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 507 days.

(21) Appl. No.: 17/966,700

(22) Filed: Oct. 14, 2022

(65) Prior Publication Data

US 2024/0126327 A1     Apr. 18, 2024

(51) Int. Cl.
*G06F 1/16*          (2006.01)

(52) U.S. Cl.
CPC ............ *G06F 1/163* (2013.01); *G06F 1/1632* (2013.01)

(58) Field of Classification Search
CPC ........... G06F 1/163; G06F 1/683; H04B 1/38; H04B 1/13827; H04B 1/1385; H04B 1/13855
See application file for complete search history.

(56) References Cited

U.S. PATENT DOCUMENTS 9,288,836 B1    3/2016   Clement et al.
9,553,625 B2 *   1/2017   Hatanaka .................. A44C 5/00

FOREIGN PATENT DOCUMENTS

CN          103984221 A      8/2014
TW          M618469 U       10/2021

* cited by examiner

*Primary Examiner* — Vanessa Girardi
(74) *Attorney, Agent, or Firm* — Foley & Lardner LLP

(57)          ABSTRACT

The present disclosure provides an electronic wearable device. The electronic wearable device includes a first module having a first contact and a second module having a second contact. The first contact is configured to keep electrical connection with the second contact in moving with respect to each other during a wearing period.

20 Claims, 9 Drawing Sheets

1

ELECTRONIC DEVICE WITH REMOVABLE ELECTRONIC COMPONENT MODULES

BACKGROUND

1. Technical Field

The present disclosure relates to an electronic wearable device.

2. Description of the Related Art

Electronic wearable devices are becoming increasingly functional. For example, components or packages (such as system in package (SiP)) may be integrated into the electronic wearable devices to perform functions, such as obtaining information or signals reflecting physical activity and/or health, capturing pictures, connecting to the Internet, etc.

When more components are integrated into the electronic wearable devices, the electronic wearable devices may get bulky or heavy. The manufacturing cost and the retail price may also increase, which decreases consumer demand for such electronic wearable devices.

In addition, in order to meet a variety of consumer demands, electronic wearable devices need to provide various functions that consumers can select from. As such, there may be a need for electronic wearable devices that have attachable and detachable components to perform functions as desired.

SUMMARY

In some embodiments, an electronic wearable device includes a first module having a first contact and a second module having a second contact. The first contact is configured to keep electrical connection with the second contact in moving with respect to each other during a wearing period.

In some embodiments, an electronic wearable device includes a carrier having a first conductive element, a first module attachable and removable with respect to the carrier, and a second module attachable and removable with respect to the carrier. The first module and the second module are electrically connected in a parallel circuit through the first conductive element.

In some embodiments, an electronic wearable device includes a first module having an opening and a first flexible connector in the opening, and a second module attachable and removable with respect to the opening of the first module. The first flexible connector is configured to secure the second module in the opening and provide a first power path for the second module

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
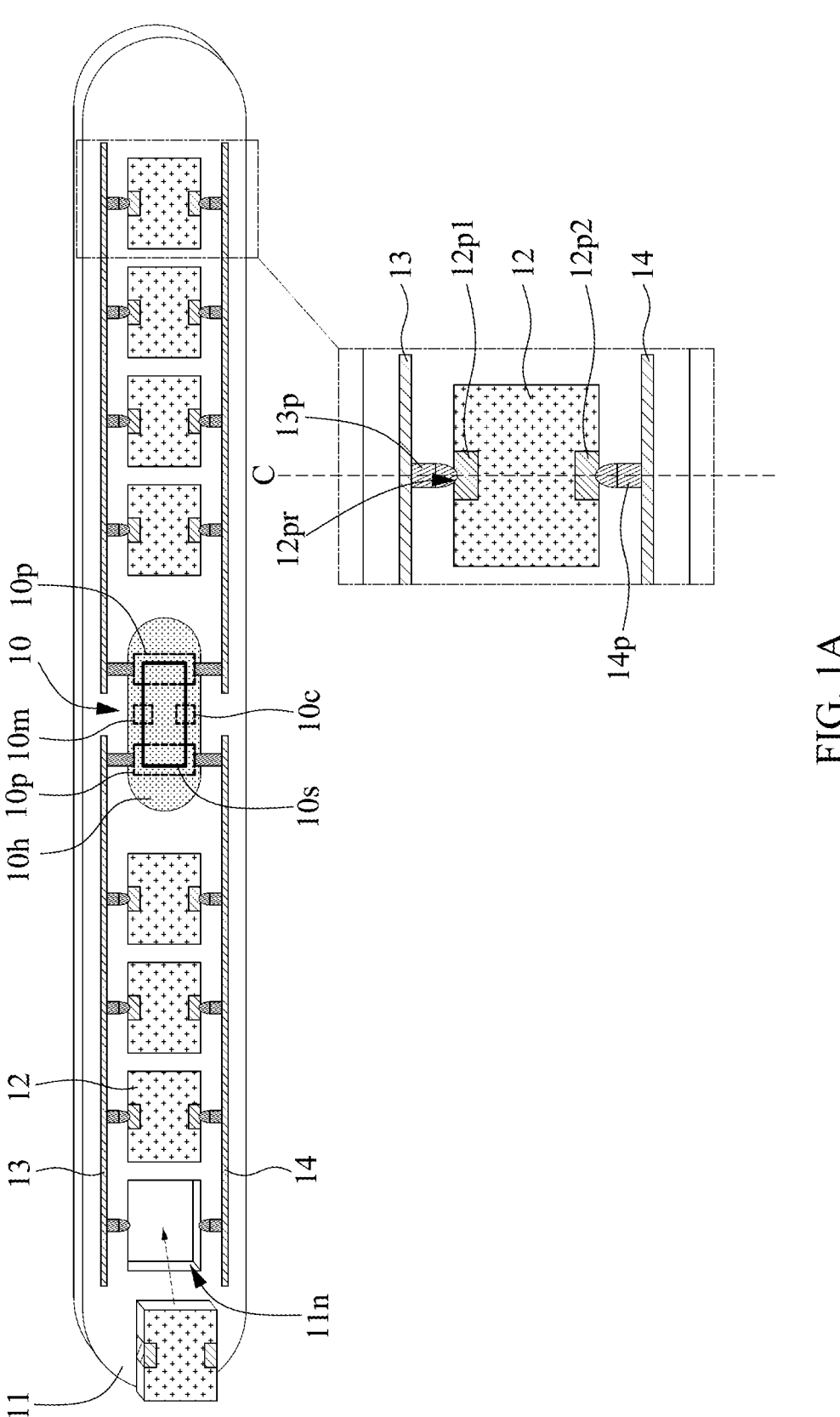
FIG. 1A illustrates a top view of a smartwatch having removable modules in accordance with a first embodiment of the present disclosure.

The following disclosure provides for many different embodiments, or examples, for implementing different features of the provided subject matter. Specific examples of components and arrangements are described as follows to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

FIG. 1A illustrates a top view of an electronic wearable device 1 in accordance with some embodiments of the present disclosure. The electronic wearable device 1 may include different types of wearable items, such as a smartwatch, a bracelet, a pair of glasses, goggles, a piece of jewelry, a piece of clothing, earphones, headphones, a helmet, or any type of wearable item that can be worn close to an/or on the surface of the skin of a user.

For ease of description, only the smartwatch is used as an example for specific descriptions in specific embodiments of the present invention. Configuration or application of the electronic wearable device 1 in the figures is for illustrative purposes only, and not intended to limit the present disclosure.

In some embodiments, the electronic wearable device 1 may include a main part 10, a carrier 11, one or more components 12, and conductive elements 13, 14.

The main part 10 may be arranged in a central location of the carrier 11. However, in some other embodiments, the main part 10 may be arranged closer to a side or an end of the carrier 11 than to the other side. In some embodiments, the main part 10 may be configured to provide or support a main function or operation of the electronic wearable device 1. For example, the main part 10 may include a dial (or a face to display time) of a smartwatch. In some embodiments, the main part 10 may be larger than any one of the components 12.

With respect to the main part 10, the components 12 may include auxiliary parts. The components 12 may be configured to provide or support auxiliary or supplementary function or operation of the electronic wearable device 1. For example, the components 12 may include auxiliary parts that may otherwise need to be located in the main part 10, and in this manner, further reduction in size of the main part 10 can be achieved.

In some embodiments, the main part 10 may include a substrate (not shown in the figures), a housing 10h, a screen 10s, one or more power sources or power supplies 10p, and one or more components 10c, 10m.

In some embodiments, the substrate may include, for example, a printed circuit board (PCB) (such as a paper-based copper foil laminate), a composite copper foil laminate, a polymer-impregnated glass-fiber-based copper foil laminate, and so on. The substrate may include a redistribution layer (RDL), a grounding element, or other conductive structures. In some arrangements, the screen 10s, the power sources 10p, the components 10c and 10m, and the components 12 associated with the electronic wearable device 1 may be electrically connected with one another through the conductive structures of the substrate.

In some other embodiments, the substrate may be omitted. For example, the screen 10s, the power sources 10p, the components 10c and 10m, and the components 12 associated with the electronic wearable device 1 may communicate with one another through conductive structures disposed in the carrier 11 or communicate with one another in a wireless communications manner, such as via radio frequency identification technology or short-range wireless communications technology.

In some embodiments, the housing 10h may be configured to define a space (or a location) to accommodate or dispose the power sources 10p, and the components 10c and 10m. In some embodiments, the housing 10h may be configured to physically separate the power sources 10p, and the components 10c and 10m from the carrier 11. In some embodiments, the housing 10h may include a lid, a frame, a plate, a peripheral wall, or other structures. In some embodiments, the housing 10h may include a metal, a plastic, a ceramic, or other feasible materials.

In some other embodiments, the housing 10h may be omitted. Therefore, the power sources 10p, and the components 10c and 10m may be covered or surrounded by the carrier 11. For example, the power sources 10p, and the components 10c and 10m may directly contact the carrier 11.

The screen 10s may be disposed over and supported by the housing 10h. The screen 10s may cover the power sources 10p, and the components 10c and 10m. In an embodiment where the housing 10h is omitted, the screen 10s may be disposed over the carrier 11. The screen 10s may display time, date, weather, atmospheric pressure, heart rate, information from the components 12, etc. The screen 10s may include a touch screen. The screen 10s may be implemented with any suitable display technology, including, but not limited to, liquid crystal display (LCD) technology, light emitting diode (LED) technology, organic light-emitting display (OLED) technology, organic electroluminescence (OEL) technology, etc.

The components 10c and 10m may include electronic components. For example, the components 10c and 10m may each include a processor, a controller, a memory, or an input/output (I/O) buffer, etc. For example, the component 10c may include a controller and may be configured to control the contents shown on the screen 10s, to control the functions of components 12 associated with the electronic wearable device 1, to connect the electronic wearable device 1 to another external device and enable the communication therebetween. In some embodiments, the component 10c may include, for example, a central processing unit (CPU), a microprocessor unit (MPU), a graphics processing unit (GPU), a microcontroller unit (MCU), an application-specific integrated circuit (ASIC), a field-programmable gate array (FPGA), or another type of integrated circuit. For example, the component 10m may include a memory and may be configured to store instructions or codes to be implemented by the component 10c, to store information or data obtained from the components 12 associated with the electronic wearable device 1, etc. In some embodiments, the component 10m may include, for example, a volatile memory, a non-volatile memory, or both.

The power sources 10p may include a battery, such as a rechargeable battery. In some embodiments, the power sources 10p may be connected to the substrate (if any). The substrate may include a charging port and may be connected to an external power source through a connector (such as a cable or an electrical wire). Power may be supplied to the power sources 10p through the connector, the charging port, and the conductive structures of the substrate. In some other embodiments, the power sources 10p may be charged by using a self-generator (such as an induction charger), solar light, or a non-contact charging method. For example, the power sources 10p may not need connectors and can be charged wirelessly.

In some embodiments, the power sources 10p may be configured to provide power signals (or power) to the components 12 associated with the electronic wearable device 1 once the components 12 are coupled to the electronic wearable device 1.

Although the electronic wearable device 1 has two power sources 10p in the main part 10, the present disclosure is not limited thereto. In some embodiments, the number and the location of the power sources 10p can be adjusted according to design requirements, such as cost, dimension, ease of maintenance, etc.

In some embodiments, the power sources 10p may also include a power management component or circuits. The power sources 10p may be configured to provide different sorts of power control to different components 12. For example, the power sources 10p may include a voltage regulator, such as a linear regulator (which is configured to maintain a constant output voltage) or a switching regulator (which is configured to generate an output voltage higher than or lower than the input voltage). In some embodiments, the power sources 10p may include a step-down (buck) converter, a step-up (boost) converter, an analog-to-digital converter, a digital-to-analog converter, an AC-DC converter, a DC-DC converter, other types of converters, or a combination thereof.

In some embodiments, the power sources $10p$ may monitor and/or manage the power state of the components 12. For example, the power sources $10p$ may detect a low voltage of any one of the components 12 and generate a constant voltage to any one of the components 12. In some embodiments, the power state of the components 12 and the power state of the power sources $10p$ may be displayed on the screen $10s$.

The carrier 11 may include a band, a strap, a loop, or a bracelet. The carrier 11 may be configured to support or carry the components 12 and the main part 10. For example, the carrier 11 may be configured to provide structural support and impact resistance for electronic or mechanical components contained therein.

For example, the carrier 11 may be configured to maintain the relative location between the electronic wearable device 1 and an object (or a wearing object). For example, the carrier 11 may be configured to make the components 12 and the main part 10 be adjacent to (or close to) the surface of the skin of the user. For example, the carrier 11 may be configured to prevent the components 12 and the main part 10 from sliding or otherwise being displaced on the user's skin.

In some embodiments, the carrier 11 may be soft and flexible enough for a user of the electronic wearable device 1 to wear comfortably for an extended time period. In some embodiments, the carrier 11 may be relatively more resistant to stress, impact, twisting or other physical or structural changes. In some embodiments, the carrier 11 may include an epoxy resin having fillers, a molding compound (e.g., an epoxy molding compound or other molding compound), a polyimide, a phenolic compound or material, a material with a silicone dispersed therein, or a combination thereof. In some embodiments, suitable materials of the carrier 11 may include metal, plastic, rubber, leather, nylon, canvas or other fibrous, organic, polymeric, or synthetic materials.

The components 12 may be attached, removed, and reattached to the carrier 11. As stated, the components 12 may be configured to provide or support auxiliary or supplementary function or operation of the electronic wearable device 1. For example, the components 12 may have different functions, and a user of the electronic wearable device 1 may attach, remove, and reattach the components 12 to the carrier 11 to obtain different functions as desired.

In some embodiments, the components 12 may include a communication module (such as a cellular communication module, a Wi-Fi communication module, a Bluetooth® module), a global position system (GPS) module, a payment transaction module (such as a near-field communication (NEC) payment transaction module), a motion sensor (such as a gyroscope or a device used for measuring or maintaining orientation and angular velocity), a sensing module configured to collect biologically-relevant (or health-relevant) information, or an indicator (such as one or more LEDs, a vibrator, or a buzzer) configured to provide biologically-relevant notifications (such as prescription timing reminders, medical alerts, medical identification numbers, etc.).

In some embodiments, the sensing module may include one or more transmitters (such as an optical transmitter, or a light-emitting diode (LED)), one or more receivers (such as an optical receiver or a photodiode (PD)), or a combination thereof. In some embodiments, the optical transmitter may be configured to radiate a light to an object (such as the user's skin) and the optical receiver is configured to receive a light reflected from the object as an external signal. The reflected light may include biologically-relevant (or health-relevant) information.

For example, when the electronic wearable device 1 is worn by a user, the light radiated by the optical transmitter of the sensing module may reach the user's skin and may be reflected by hemoglobin in a blood vessel. The optical receiver of the sensing module may receive the reflected light as an external signal. The component $10c$ in the main part 10 (or another processor associated with the electronic wearable device 1) may further process the external signal, so as to obtain the detection result, such as oxygen saturation (SpO2), heart rate (HR), blood oxygen saturation, blood pressure, heart rate variability (HRV), respiratory rate (breaths per minute, brpm), pulse travel time (PTT), electroencephalogram (EEG), electrocardiogram (ECG), electromyogram (EMG), electrooculogram (EOG), galvanic skin response (GSR), sweat composition, or other biologically-relevant information.

In some embodiments, the electronic wearable device 1 may perform data communication with a base station, a terminal device (such as a mobile phone), or another external device. In some embodiments, the electronic wearable device 1 may be used in combination with other corresponding external devices for further processing the acquired signal from the sensing module.

In some embodiments, the components 12 may be configured to detect or collect one or more signals or pieces of information external to the electronic wearable device 1. For example, the components 12 may be configured to detect light, sound, temperature, air pressure, smell, particle, humidity, or other environmental variables. For example, the components 12 may include an optical sensor, a microphone, a temperature sensor, a pressure sensor, a particle sensor, or other sensing devices configured to detect an external signal.

In some embodiments, the biologically-relevant information and/or the external signal from the components 12 may be shown on the screen $10s$.

In some embodiments, the carrier 11 may include one or more openings, apertures, recesses or notches $11n$ for receiving the components 12. The components 12 may be plugged, accommodated, or inserted in the openings $11n$. The openings $11n$ may be recessed from a surface of the carrier 11. The openings $11n$ may have a base portion (or a bottom surface) and sidewalls extending from the base portion. The components 12 may be disposed on the base portion of the openings $11n$ and surrounded by the sidewalls. The sidewalls of the openings $11n$ may be connected together. In some embodiments, the openings $11n$ may include rectangular shapes, circular shapes, and other shapes.

Once the components 12 are plugged, accommodated, or inserted in the openings $11n$, the components 12 may each be electrically connected to the power sources $10p$ through the conductive elements 13 and 14.

The conductive elements 13 and 14 may include conductive wires, conductive pillars, conductive vias, conductive pads, etc. The conductive elements 13 and 14 may include conductive materials, such as copper (Cu), tin (Sn), aluminum (Al), gold (Au), silver (Ag), tungsten (W), nickel (Ni), or other suitable materials. The conductive elements 13 and 14 may be surrounded or covered by the carrier 11. In some embodiments, the carrier 11 may be configured to support and protect the conductive elements 13 and 14.

In some embodiments, the conductive elements 13 and 14 may be configured to provide power paths between the power sources $10p$ and the components 12. For example, power signals (or power) may be transmitted from the power sources 10p to the components 12 through the conductive elements 13 and 14. In some embodiments, the components 12 may each include a battery (or a capacitor for storing energy) smaller than the power sources 10p.

As used herein, a power path may refer to a path dedicated to power supply connections. Additionally, a signal path may refer to a path through which an electrical signal may be transmitted. Such an electrical signal may include either analog or digital signals.

In some embodiments, the conductive element 13 may be configured to transmit positive voltage power and the conductive element 14 may be configured to transmit negative voltage power (or reference power or grounding voltage), or vice versa. For example, the conductive element 13 may be electrically connected to the positive terminal of the power source 10p and the conductive element 14 may be electrically connected to the negative terminal of the power source 10p, or vice versa.

A plurality or all of the components 12 associated with the electronic wearable device 1 may be charged through the conductive elements 13 and 14. The number of conductive elements 13 and 14 is not limited to the specific drawings. For example, the conductive elements 13 and 14 on the left side (or the right side) of the electronic wearable device 1 may be omitted.

In some embodiments, the components 12 may be electrically connected a parallel circuit. For example, the components 12 may have the same difference of potential (voltage) across their ends. The components 12 may be charged independently. For example, the power connections for the components 12 may not be affected when one of the components 12 is removed from the opening of the carrier 11.

In some embodiments, the components 12 may be secured or fixed to the openings 11n. For example, the components 12 may be mechanically joined or connected to the openings 11n. In some embodiments, the components 12 may be configured to constructively form a part of the carrier 11.

For example, the components 12 and the openings 11n may have a mechanical or magnetic means to resist or arrest the movement of the components 12. The mechanical or magnetic means may prevent unintended separation of the components 12 and the openings 11n. The mechanical or magnetic means may include locking elements, fastening elements, retaining elements, etc. More specifically, the mechanical or magnetic means may include a pin, a post, a spring, a plugger, a buffer, a snap, a clip, a contour, etc.

As shown in the enlarged view, the conductive elements 13 and 14 may be electrically connected with electrical contacts 13p and 14p. The component 12 has conductive pads 12p1 and 12p2 configured to connect to the electrical contacts 13p and 14p. When the component 12 is disposed in the opening 11n, the electrical contacts 13p and 14p may collectively secure the component 12 in the opening 11n. For example, the electrical contacts 13p and 14p may prevent the component 12 from falling out of the opening 11n. In some embodiments, the electrical contacts 13p and 14p may also be configured to provide power paths between the power sources 10p and the component 12. In other words, the electrical contacts 13p and 14p may provide structural support to secure the component 12 in the opening 11n and also provide electrical connection to charge the component 12. In some embodiments, the electrical contacts 13p and 14p may have different electric potentials. In some embodiments, the electrical contact 13p may be configured to transmit positive voltage power and the electrical contact

14p may be configured to transmit negative voltage power (or reference power or grounding voltage), or vice versa.

The electrical contacts 13p and 14p may include flexible or deformable connectors. In some embodiments, the electrical contacts 13p and 14p may include POGO pins or spring-loaded pins. For example, the electrical contacts 13p and 14p may be deformed to absorb mechanical shock and vibration. In some embodiments, the electrical contacts 13p and 14p may apply a force (such as a normal force) against the conductive pads 12p1 and 12p2, counteracting unwanted movements which might otherwise cause an intermittent connection. In some embodiments, circuit portions (such as the conductive pads 12p1 and 12p2) of the component 12 and the electrical contacts 13p and 14p may function as extending portions of the conductive elements 13 and 14.

In some embodiments, the conductive pads 12p1 and 12p2 may each include a recess 12pr. The recess 12pr may each have a contour corresponding to the electrical contacts 13p and 14p. For example, a part of the outline or shape of the electrical contacts 13p and 14p can match or fit in the recesses 12pr. Such arrangements of the conductive pads 12p1 and 12p2 may help facilitate connection with the electrical contacts 13p and 14p.

In some embodiments, the conductive pad 12p1 and the electrical contact 13p form an electrical connecting point (or an electrical connecting interface) and the conductive pad 12p2 and the electrical contact 14p form an electrical connecting point (or an electrical connecting interface). An axis C passes through the two electrical connecting points. The conductive pads 12p1 and 12p2 may be rotatable with respect to the axis C. In some embodiments, the conductive pads 12p1 and 12p2 may rotate with respect to the axis C while electrically connecting to the electrical contacts 13p and 14p. For example, the conductive pads 12p1 and 12p2 may rotate with respect to the axis C without being disconnected from the electrical contacts 13p and 14p. For example, the conductive pads 12p1 and 12p2 may be movable with respect to the electrical contacts 13p and 14p without being disconnected from the electrical contacts 13p and 14p. For example, the electrical contact 13p is configured to electrical connect to the conductive pad 12p1 in operation of moving with respect to each other. For example, the electrical contact 13p is configured to keep electrical connection with the conductive pad 12p1 during a wearing period. For example, the electrical contact 14p is configured to electrical connect to the conductive pad 12p2 in operation of moving with respect to each other. For example, the electrical contact 14p is configured to keep electrical connection with the conductive pad 12p2 during a wearing period.

In some embodiments, one of the components 12 and the other part of the electronic wearable device 1 may be viewed as functional modules. The electrical contact (such as the conductive pad 12p1) of the component 12 and the electrical contact (such as the electrical contact 13p) of the other part of the electronic wearable device 1 may be movable with respect to each other without being disconnected from each other.

In a comparative embodiment, components are integrated in the main part of the electronic wearable device (such as the dial of the smart watch) to provide various functions, and the electronic wearable device gets bulky and heavy.

According to some embodiments of the present disclosure, the components 12 having different functions can be suitable for rapid and convenient attachment, detachment, and reattachment of the electronic wearable device 1. In comparison with the above comparative embodiment, the size of the main part 10 can be decreased. The user can choose which of the components 12 are to be inserted in the electronic wearable device 1 according to the functions thereof. Therefore, the user can select and design their own electronic wearable device as needed rather than using a mass produced one.

In addition, by disposing or integrating components (the power sources 10*p*, the controller, the memory, etc.) that can be shared among the components 12 in the main part 10, duplicating resources on the carrier 11 can be avoided and the electronic wearable device 1 can become lighter and have a trendier and smarter design.

Furthermore, since the conductive pads 12*p*1 and 12*p*2 are movable with respect to the electrical contacts 13*p* and 14*p* without being disconnected from the electrical contacts 13*p* and 14*p*, the electrical connections for the components 12 are stable. Therefore, the components 12 can keep functioning and/or being charged while the carrier 11 is being twisted, bent, pressed, pulled, deformed, etc.

Figure 1B:
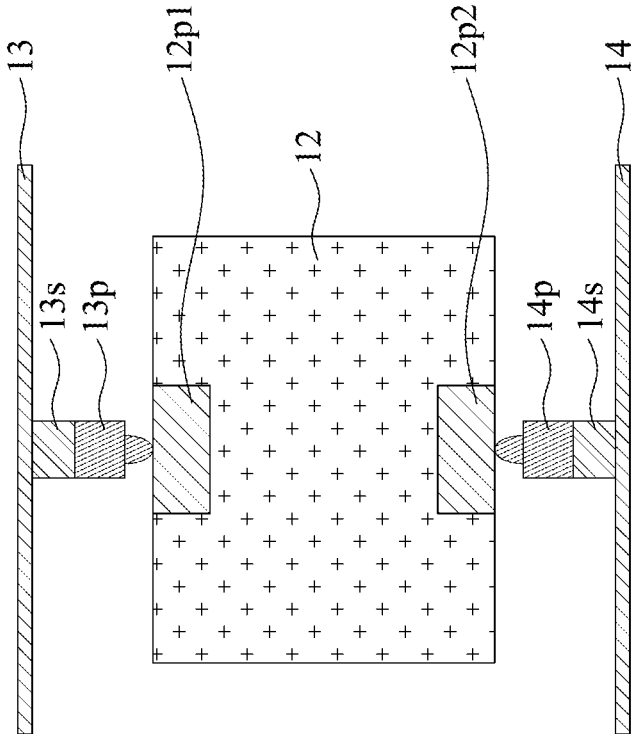
FIG. 1B illustrates a top view of a removable module and conductive elements of a smartwatch in accordance with a second embodiment of the present disclosure.

FIG. 1B illustrates a top view of a part of an electronic wearable device in accordance with some embodiments of the present disclosure. The part of the electronic wearable device in FIG. 1B is similar to the enlarged view in FIG. 1A except for the differences described as follows.

The conductive element 13 may be electrically connected with the electrical contact 13*p* through a spring 13*s*. The spring 13*s* may include a conductive compression spring and may help press the electrical contact 13*p* on the conductive pad 12*p*1. Similarly, the conductive element 14 may be electrically connected with the electrical contact 14*p* through a spring or an elastic element 14*s*. Other substitutions for the springs may include a plugger, a buffer, or other elastic elements.

In some embodiments, the conductive pads 12*p*1 and 12*p*2 may each include a flat surface. In some other embodiments, the conductive pads 12*p*1 and 12*p*2 may be processed to increase friction with the electrical contacts 13*p* and 14*p*.

Figure 1C:
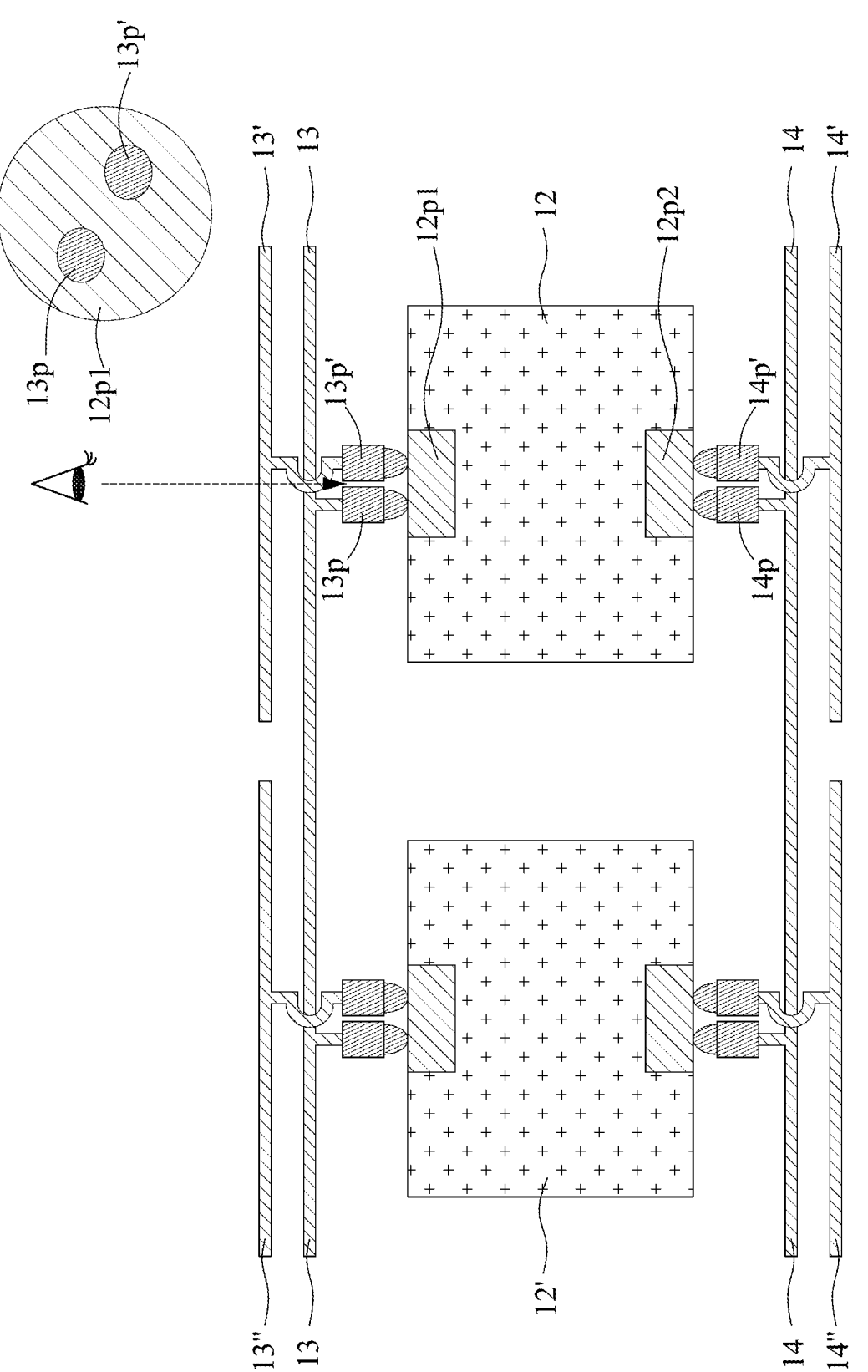
FIG. 1C illustrates a top view of a removable module and conductive elements of a smartwatch in accordance with a third embodiment of the present disclosure.

FIG. 1C illustrates a top view of a part of an electronic wearable device in accordance with some embodiments of the present disclosure. The part of the electronic wearable device in FIG. 1C is similar to the enlarged view in FIG. 1A except for the differences described as follows.

The conductive element 13 may be electrically connected with the conductive pad 12*p*1 of the component 12 through the electrical contact 13*p* and electrically connected with a conductive pad (not labelled) of the component 12'. Similarly, the conductive element 14 may be electrically connected with the conductive pad 12*p*2 of the component 12 through the electrical contact 14*p* and electrically connected with a conductive pad (not labelled) of the component 12'. In some embodiments, the conductive elements 13 and 14 may be configured to provide power paths.

The conductive element 13' may be electrically connected with the conductive pad 12*p*1 through the electrical contact 13*p'*. The conductive element 13" may be electrically connected with a conductive pad (not labelled) of the component 12'. The conductive element 13' and the conductive element 13" may be electrically insulated from each other. The conductive element 14' may be electrically connected with the conductive pad 12*p*4 of the component 12 through the electrical contact 14*p'*. The conductive element 14" may be electrically connected with a conductive pad (not labelled) of the component 12'. The conductive element 14' and the conductive element 14" may be electrically insulated from each other. In some embodiments, the conductive elements 13', 13", 14', and 14" may be configured to provide signal paths.

In some embodiments, the conductive pad 12*p*1 may be movable with respect to the electrical contacts 13*p* and 13*p'* without being disconnected from the electrical contacts 13*p* and 13*p'*.

In some other embodiments, the electrical contacts 13*p* and 13*p'* may be electrically connected with different conductive pads of the component 12.

Figure 1D:
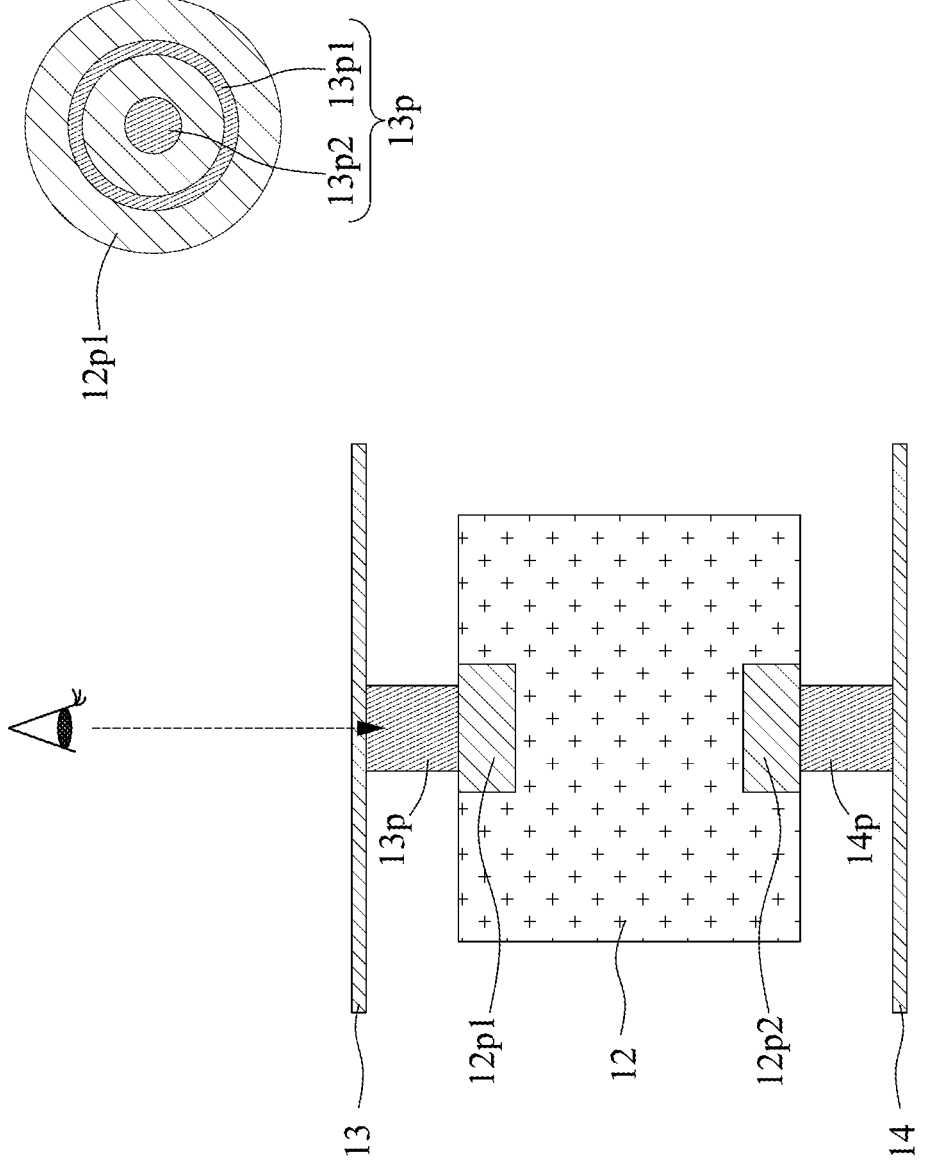
FIG. 1D illustrates a top view of a removable module and conductive elements of a smartwatch in accordance with a fourth embodiment of the present disclosure.

FIG. 1D illustrates a top view of a part of an electronic wearable device in accordance with some embodiments of the present disclosure. The part of the electronic wearable device in FIG. 1D is similar to the enlarged view in FIG. 1A except for the differences described as follows.

In some embodiments, the electrical contact 13*p* forms two electrical connecting interfaces 13*p*1 and 13*p*2 with the conductive pad 12*p*1. The electrical connecting interfaces 13*p*1 and 13*p*2 may take the form of concentric circles. The electrical connecting interfaces 13*p*1 and 13*p*2 may arrange in concentric circles.

In some embodiments, the electrical connecting interfaces 13*p*1 and 13*p*2 may be configured to provide power paths between the power source (such as the power source 10*p* in FIG. 1A) and the component 12. In some other embodiments, the electrical connecting interface 13*p*1 may be configured to provide a power path and the electrical connecting interface 13*p*2 may be configured to provide a signal path. In some other embodiments, the electrical connecting interfaces 13*p*1 and 13*p*2 may be configured to provide different signals to the conductive pad 12*p*1. In some embodiments, the electrical connecting interfaces 13*p*1 and 13*p*2 may be electrically insulated from each other. In some embodiments, the electrical connecting interfaces 13*p*1 and 13*p*2 may be physically separated from each other by an insulating material or by an air gap.

In some embodiments, the conductive pad 12*p*1 may be movable with respect to the electrical connecting interfaces 13*p*1 and 13*p*2 without being disconnected from the electrical contact 13*p*.

Figure 1E:
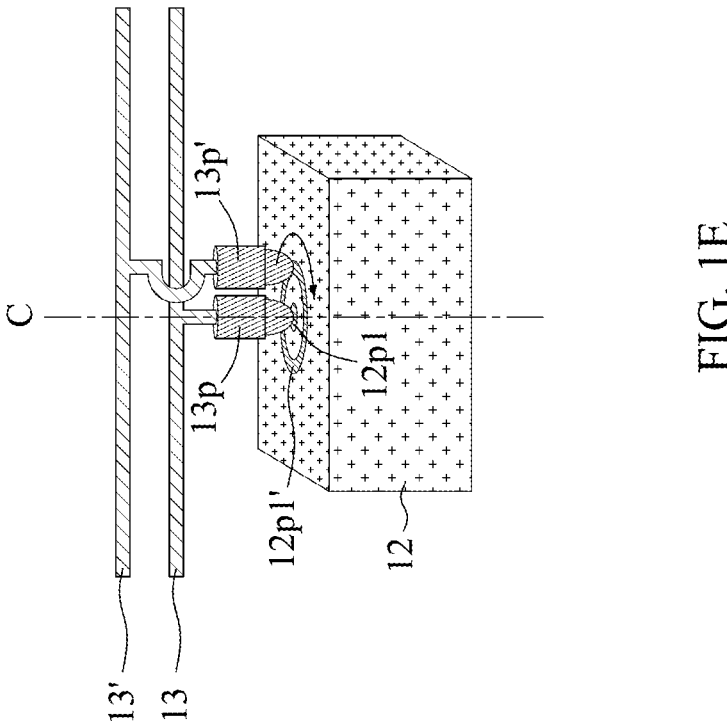
FIG. 1E illustrates a perspective view of a removable module and conductive elements of a smartwatch in accordance with a fifth embodiment of the present disclosure.

FIG. 1E illustrates a perspective view of a part of an electronic wearable device in accordance with some embodiments of the present disclosure. The part of the electronic wearable device in FIG. 1E is similar to the part of the electronic wearable device in FIG. 1C except for the differences described as follows.

The conductive pad 12*p*1 may be electrically connected with the electrical contact 13*p*. A conductive pad 12*p*1' may be electrically connected with the electrical contact 13*p'*. The conductive pad 12*p*1 and the conductive pad 12*p*1' may arrange in concentric circles. The electrical contact 13*p'* may rotate with respect to the axis C passing through the conductive pad 12*p*1.

Figure 1F:
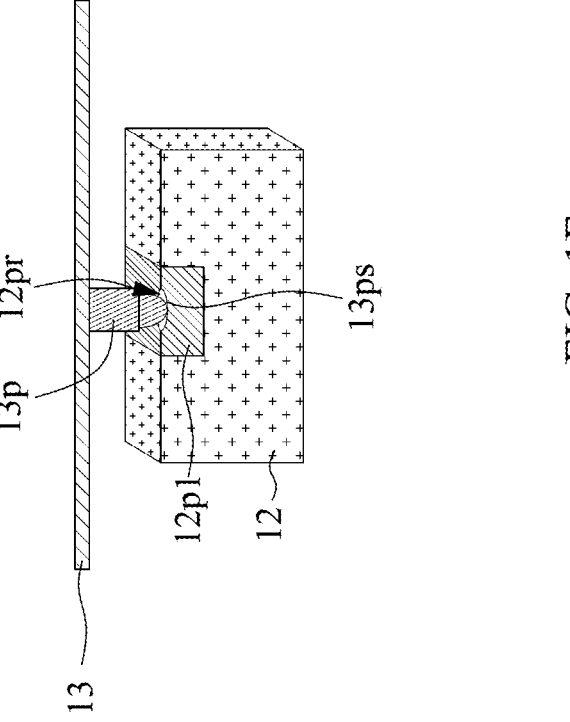
FIG. 1F illustrates a perspective view of a removable module and conductive elements of a smartwatch in accordance with a sixth embodiment of the present disclosure.

FIG. 1F illustrates a perspective view of a part of an electronic wearable device in accordance with some embodiments of the present disclosure.

The conductive pad 12*p*1 may have the recess 12*pr* greater than a surface 13*ps* of the electrical contact 13*p*. The electrical contact 13*p* may include an electric brush. In some embodiments, the electrical contact 13*p* may be configured to move in the recess 12*pr*. In some embodiments, the movements of electrical contact 13*p* may be confined by the recess 12*pr*. In some embodiments, the conductive pad 12*p*1 may be configured to move with respect to the surface 13*ps* of the electrical contact 13*p*.

Figure 2A:
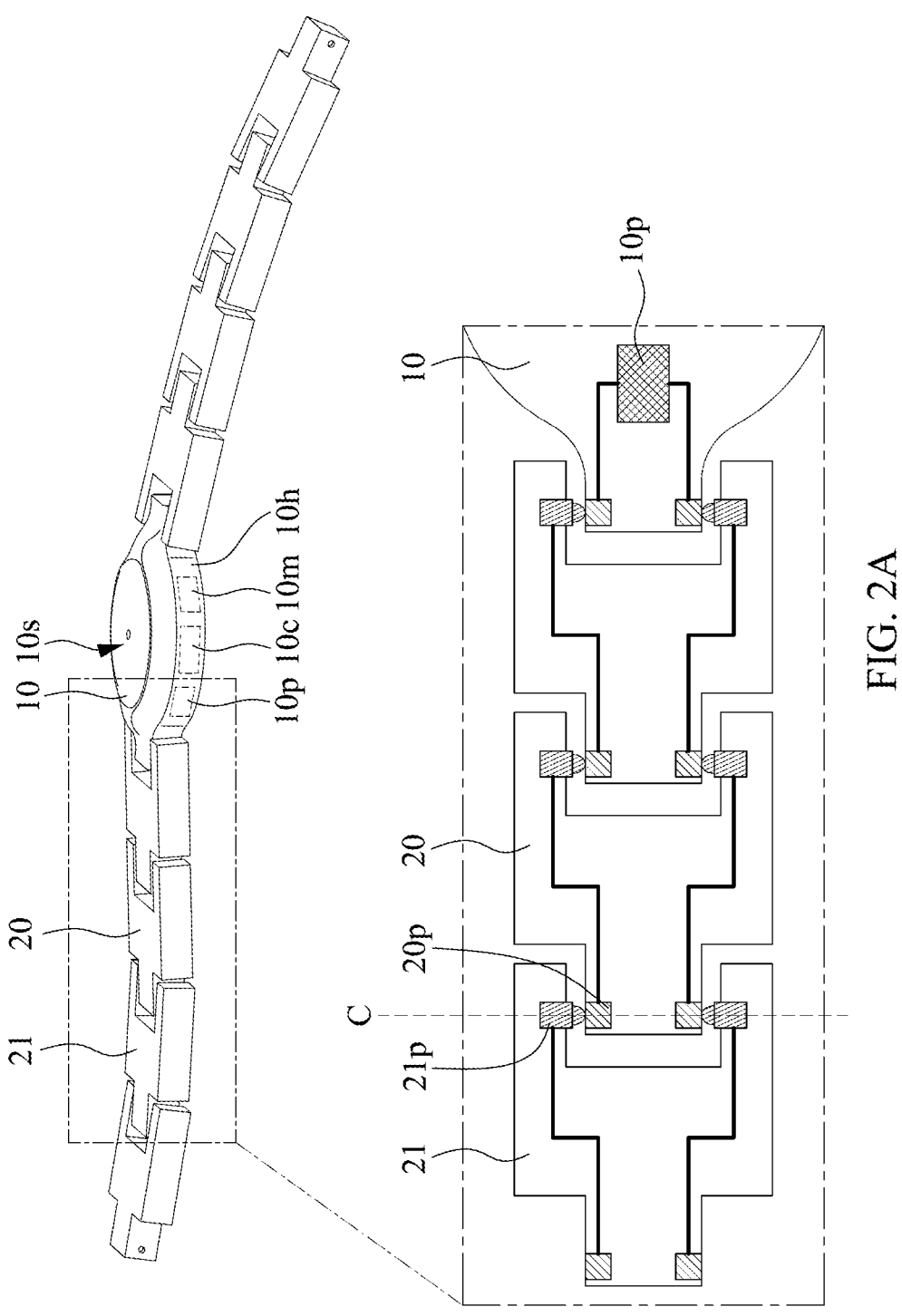
FIG. 2A illustrates a perspective view of a smartwatch having removable modules in accordance with a seventh embodiment of the present disclosure.

FIG. 2A illustrates a perspective view of an electronic wearable device 2 in accordance with some embodiments of the present disclosure. The electronic wearable device 2 in FIG. 2A is similar to the electronic wearable device 1 in FIG. 1A except for the differences described as follows.

The electronic wearable device 2 may include components 20 and 21 connected in series. The components 20 and 21 are similar to the components 12 in FIG. 1A. Therefore, some detailed descriptions may refer to the corresponding paragraphs above and are not repeated hereinafter for conciseness.

The components 20 and 21 may be assembled and function as a band, a strap, a loop, or a bracelet. When the electronic wearable device 2 is worn by a user, the components 20 and 21 may directly contact the user's skin. The components 20 and 21 may be attached, removed, and reattached to one another as desired.

In some embodiments, the components 20 and 21 may have a mechanical or magnetic means to resist or arrest the movement of the components 20 and 21. The mechanical or magnetic means may prevent unintended separation of the components 20 and 21. The mechanical or magnetic means may include locking elements, fastening elements, retaining elements, etc. More specifically, the mechanical or magnetic means may include a pin, a post, a spring, a plugger, a buffer, a snap, a clip, a contour, etc.

As shown in the enlarged view, the components 20 and 21 may be electrically connected with each other through a conductive pad 20*p* of the component 20 and an electrical contact 21*p* of the component 21. The component 20 may include circuit portions functioning as extending portions of the conductive pad 20*p*. For example, the component 20 may include a circuit layer electrically connected to the conductive pad 20*p*. The component 21 may include circuit portions functioning as extending portions of the electrical contact 21*p*. For example, the component 21 may include a circuit layer electrically connected to the conductive pad 21*p*.

When the component 20 is connected to the component 21, the conductive pad 20*p* and the electrical contact 21*p* may secure the component 20. In some embodiments, the conductive pad 20*p* and the electrical contact 21*p* may also be configured to provide a power path among the power source 10*p*, and the components 20 and 21. In other words, the conductive pad 20*p* and the electrical contact 21*p* may provide structural support to secure the component 20 and also provide electrical connection to charge the components 20 and 21.

In some embodiments, the conductive pads 20*p* of the component 20 may rotate with respect to the axis C while electrically connecting to the electrical contacts 21*p* of the component 21. For example, the conductive pads 20*p* of the component 20 may rotate with respect to the axis C without being disconnected from the electrical contacts 21*p* of the component 21. For example, the conductive pads 20*p* of the component 20 may be movable with respect to the electrical contacts 21*p* of the component 21 without being disconnected from the electrical contacts 21*p* of the component 21.

Figure 2B:
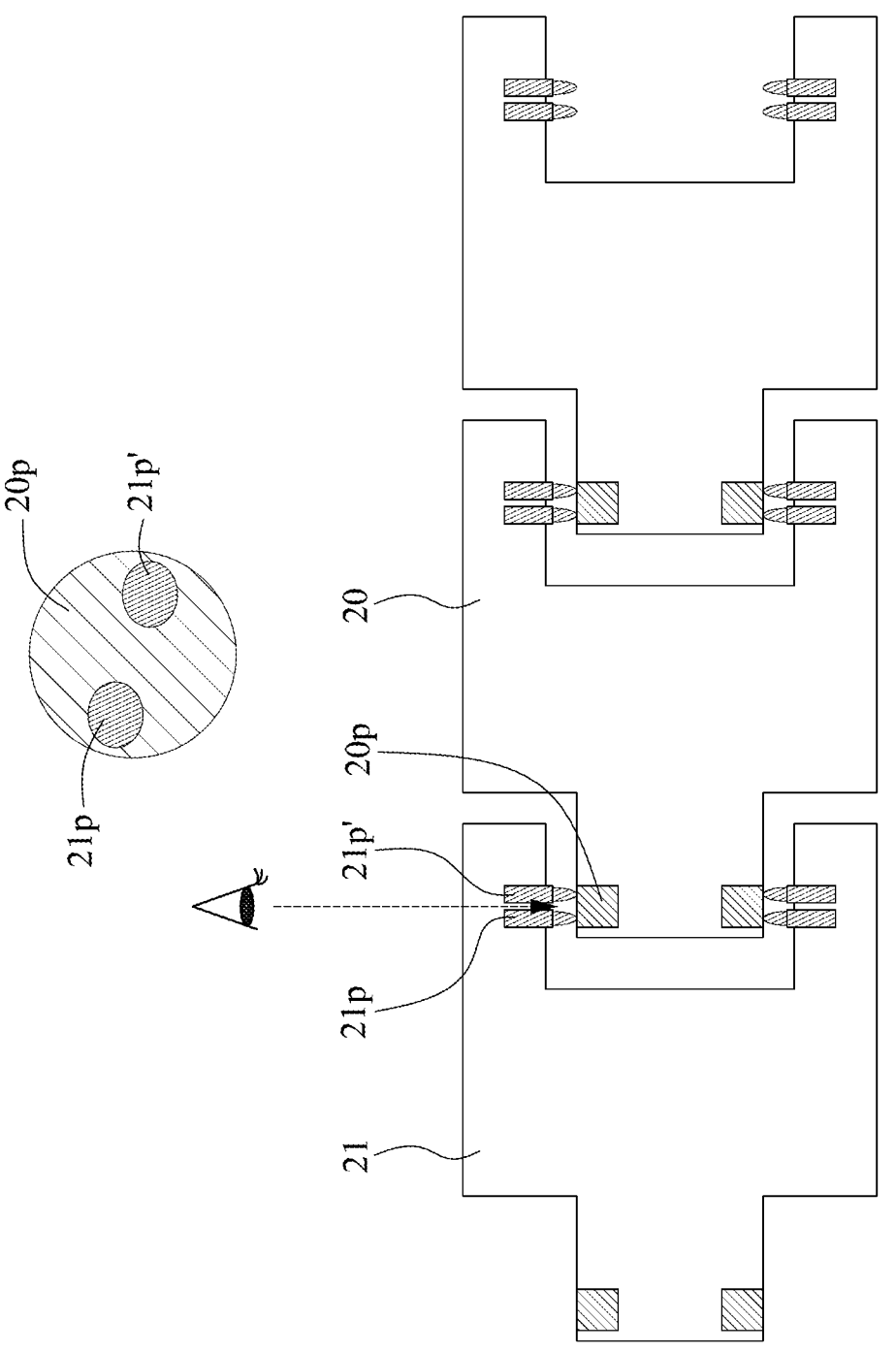
FIG. 2B illustrates a top view of removable modules of a smartwatch in accordance with an eighth embodiment of the present disclosure.

FIG. 2B illustrates a top view of a part of an electronic wearable device in accordance with some embodiments of the present disclosure. The part of the electronic wearable device in FIG. 2B is similar to the enlarged view in FIG. 2A except for the differences described as follows.

There may be two electrical contacts 21*p* and 21*p*' electrically connected with the conductive pad 20*p*. In some embodiments, the electrical contacts 21*p* and 21*p*' may be configured to provide power paths between the power source (such as the power source 10*p* in FIG. 2A) and the component 20. In some other embodiments, the electrical contact 21*p* may be configured to provide a power path and the electrical contact 21*p*' may be configured to provide a signal path. In some other embodiments, the electrical contacts 21*p* and 21*p*' may be configured to provide different signals to the conductive pad 20*p*.

In some embodiments, the conductive pad 20*p* may be movable with respect to the electrical contacts 21*p* and 21*p*' without being disconnected from the electrical contacts 21*p* and 21*p*'.

Figure 2C:
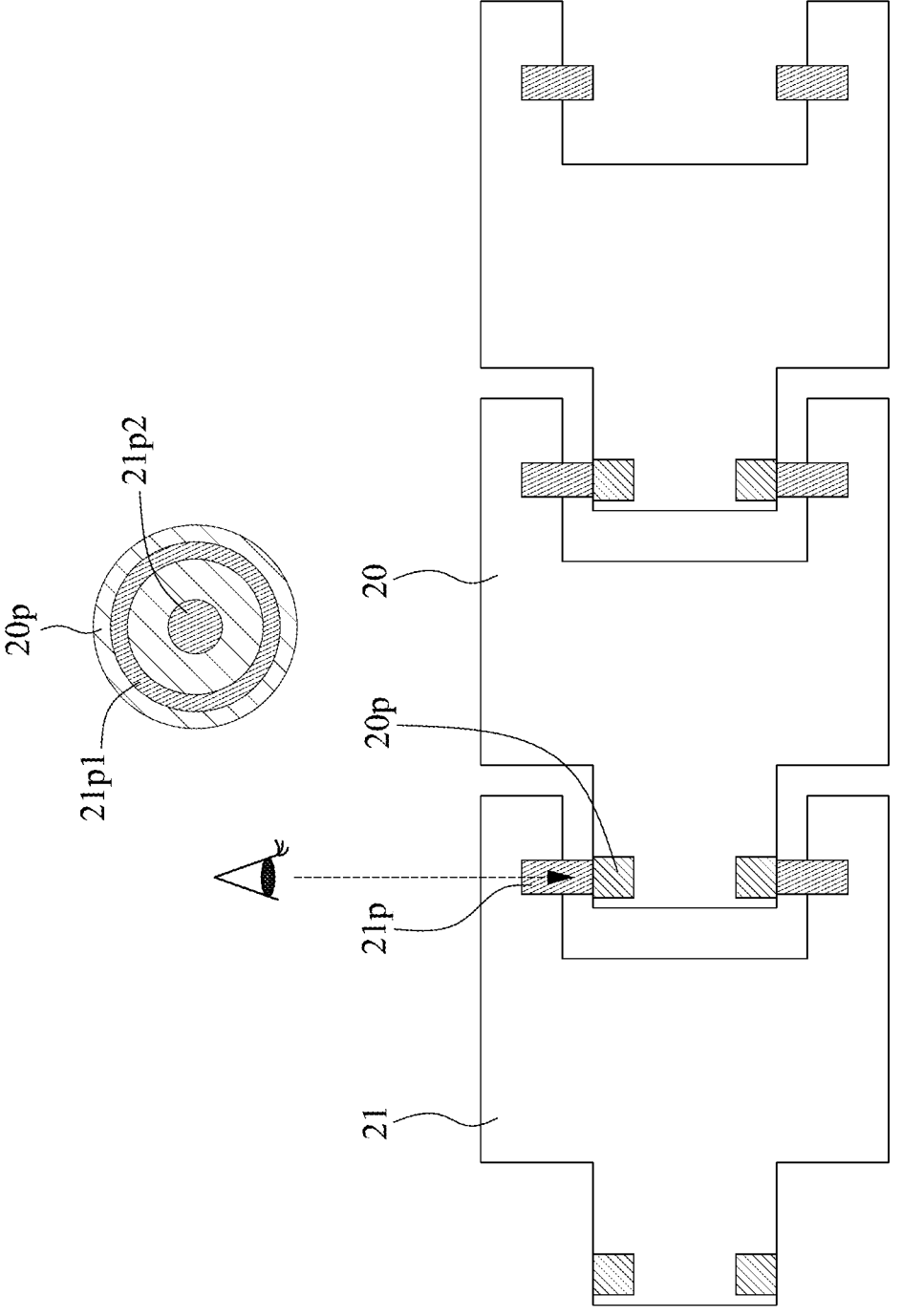
FIG. 2C illustrates a top view of removable modules of a smartwatch in accordance with a ninth embodiment of the present disclosure.

FIG. 2C illustrates a top view of a part of an electronic wearable device in accordance with some embodiments of the present disclosure. The part of the electronic wearable device in FIG. 2C is similar to the enlarged view in FIG. 2A except for the differences described as follows.

In some embodiments, the electrical contact 21*p* forms two electrical connecting interfaces 21*p*1 and 21*p*2 with the conductive pad 20*p*. The electrical connecting interfaces 21*p*1 and 21*p*2 may in the form of concentric circles.

In some embodiments, the electrical connecting interfaces 21*p*1 and 21*p*2 may be configured to provide power paths between the power source (such as the power source 10*p* in FIG. 2A) and the component 20. In some other embodiments, the electrical connecting interface 21*p*1 may be configured to provide a power path and the electrical connecting interface 21*p*2 may be configured to provide a signal path. In some other embodiments, the electrical connecting interfaces 21*p*1 and 21*p*2 may be configured to provide different signals to the conductive pad 20*p*.

In some embodiments, the conductive pad 20*p* may be movable with respect to the electrical connecting interfaces 21*p*1 and 21*p*2 without being disconnected from the electrical contact 21*p*.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic wearable device, comprising:
a carrier having a first opening, a second opening, and a first conductive element extending along at least a side of the first opening and a side of the second opening, wherein the first conductive element connects with a first electrical contact in at least the first opening;
a first module attachable and removable with respect to the first opening, wherein the first module has a first conductive pad; and
a second module attachable and removable with respect to the second opening, the first conductive element extending along at least the first module and the second module,
wherein the first electrical contact is configured to keep electrical connection with the first conductive pad during a wearing period.

2. The electronic wearable device of claim 1, further comprising:
a third module attachable and removable with respect to a third opening of the carrier,
wherein the third module is disposed between the first module and the second module, and wherein the first module is electrically connected to the second module without the third module.

3. The electronic wearable device of claim 1, wherein the carrier further comprises a third opening between the first opening and the second opening, and configured not to accommodate any module.

4. The electronic wearable device of claim 1, wherein the side of the first opening and the side of the second opening are physically connected through the carrier.

5. The electronic wearable device of claim 1, wherein the first module is entirely disposed in the first opening.

6. The electronic wearable device of claim 5, wherein when the electronic wearable device is worn on a user's skin, the carrier has a surface facing away from the user's skin, and the first opening is recessed from the surface of the carrier, wherein the first opening has a bottom surface and sidewalls extending from the bottom surface, and wherein the first module is disposed on the bottom surface and surrounded by the sidewalls.

7. The electronic wearable device of claim 5, wherein when the electronic wearable device is worn on a user's skin, the first module and the second module are spaced apart from the user's skin by the carrier.

8. The electronic wearable device of claim 1, wherein the carrier further comprises a second conductive element extending along at least the first module and the second module, wherein the second conductive element connects with a second electrical contact in at least the first opening, wherein the second electrical contact is configured to keep electrical connection with a second conductive pad of the first module during the wearing period.

9. The electronic wearable device of claim 8, wherein the first module is rotatable with respect to an axis passing through the first electrical contact and the second electrical contact.

10. The electronic wearable device of claim 9, wherein the axis does not pass through the second module.

11. An electronic wearable device, comprising:
a carrier having a first opening, a second opening, and a first conductive element extending along at least a side of the first opening and a side of the second opening;
a first module attachable and removable with respect to the first opening; and
a second module attachable and removable with respect to the second opening, the first conductive element extending along at least the first module and the second module,
wherein the first module and the second module are electrically connected in a parallel circuit through the first conductive element.

12. The electronic wearable device of claim 11, wherein the first module is entirely disposed in the first opening.

13. The electronic wearable device of claim 11, further comprising:
a third module attachable and removable with respect to a third opening of the carrier,
wherein the third module is disposed between the first module and the second module, and
wherein the first module is electrically connected to the second module without the third module.

14. The electronic wearable device of claim 11, wherein the carrier further comprises a third opening between the first opening and the second opening, and configured not to accommodate any module.

15. The electronic wearable device of claim 11, wherein when the electronic wearable device is worn on a user's skin, the carrier has a surface facing away from the user's skin, and the first opening and the second opening are recessed from the surface of the carrier.

16. The electronic wearable device of claim 15, wherein the first module and the second module are overlapped with the carrier along a direction substantially perpendicular to the surface of the carrier.

17. An electronic wearable device, comprising:
   a carrier having a first opening, a second opening, a first electrical contact in at least the first opening, and a first conductive element extending along at least a side of the first opening and a side of the second opening;
   a first module attachable and removable with respect to the first opening; and
   a second module attachable and removable with respect to the second opening, the first conductive element extending along at least the first module and the second module,
   wherein the first electrical contact is configured to secure the first module in the first opening and provide a first power path for the first module.

18. The electronic wearable device of claim 17, wherein the carrier further comprises a second conductive element and a second electrical contact configured to secure the first module in the first opening and provide a second power path for the first module, and wherein the second conductive element extends along at least the first module and the second module.

19. The electronic wearable device of claim 18, wherein the first module is entirely disposed in the first opening and the second module is entirely disposed in the second opening.

20. The electronic wearable device of claim 19, further comprising:
   a third module attachable and removable with respect to a third opening of the carrier,
   wherein the third module is disposed between the first module and the second module, and
   wherein the first module is electrically connected to the second module without the third module.

* * * * *